United States Patent
Blinn (10) Patent No.: US 10,360,292 B2
(45) Date of Patent: *Jul. 23, 2019

(54) LIGHTWEIGHT WEB PAGE GENERATION

(71) Applicant: Go Daddy Operating Company, LLC, Scottsdale, AZ (US)

(72) Inventor: Arnold Blinn, Hunts Point, WA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 252 days.

This patent is subject to a terminal disclaimer.

(21) Appl. No.: 15/452,161

(22) Filed: Mar. 7, 2017

(65) Prior Publication Data
US 2017/0177549 A1    Jun. 22, 2017

Related U.S. Application Data

(63) Continuation of application No. 14/208,986, filed on Mar. 13, 2014, now Pat. No. 9,633,128.

(51) Int. Cl.
| | |
|---|---|
| G06F 17/21 | (2006.01) |
| G06F 17/22 | (2006.01) |
| G06Q 30/02 | (2012.01) |
| G06F 16/958 | (2019.01) |
| G06F 16/957 | (2019.01) |
| G06Q 20/02 | (2012.01) |
| H04L 29/12 | (2006.01) |
| H04L 29/08 | (2006.01) |

(52) U.S. Cl.
CPC ...... *G06F 17/2247* (2013.01); *G06F 16/9577* (2019.01); *G06F 16/972* (2019.01); *G06F 17/211* (2013.01); *G06F 17/2205* (2013.01); *G06F 17/227* (2013.01); *G06Q 20/02* (2013.01); *G06Q 30/0277* (2013.01); *H04L 61/1511* (2013.01); *H04L 67/20* (2013.01)

(58) Field of Classification Search
CPC .................................................. G06F 17/2247
USPC ......................................................... 715/234
See application file for complete search history.

(56) References Cited

U.S. PATENT DOCUMENTS

| | | | | |
|---|---|---|---|---|
| 8,312,125 B1 * | 11/2012 | Rioux | ................. | H04L 61/3025 709/203 |
| 2009/0240709 A1 * | 9/2009 | Adelman | ............... | G06Q 10/10 |
| 2009/0240799 A1 * | 9/2009 | Adelman | ............... | G06Q 10/06 709/224 |

(Continued)

OTHER PUBLICATIONS

Rosenbaum, Rich. Using the domain name system to store arbitrary string attributes. No. RFC 1464. 1993. pp. 1-4 (Year: 1993).*

(Continued)

*Primary Examiner* — Frank D Mills
(74) *Attorney, Agent, or Firm* — Quarles & Brady LLP (57) ABSTRACT

A system and method for rendering web pages is presented. A request identifying a domain name and a web page is received by at least one server communicatively coupled to a network. A TXT record associated with the domain name is then retrieved by the at least one server and the TXT record is analyzed to identify one or more settings associated with the domain name or the web page. The web page is then rendered in accordance with the one or more settings into a rendered web page by the at least one server. Finally, the rendered web page is transmitted to a computer system using the network.

20 Claims, 5 Drawing Sheets

(56) References Cited

U.S. PATENT DOCUMENTS

2009/0240835 A1* 9/2009 Adelman .......... H04L 29/12066
709/245
2012/0303762 A1* 11/2012 Geiser .................. G06F 9/4416
709/219
2014/0222906 A1* 8/2014 Isler ....................... H04L 67/16
709/203
2015/0006687 A1* 1/2015 Baskwill ............. H04L 41/0816
709/221

OTHER PUBLICATIONS

Rosenbaum, Rich. Using the domain name system to store arbitrary string attributes. No. RFC 1464. 1993. (Year: 1993).*

* cited by examiner

```
@    IN    SOA  ns.company.com.    postmaster.company.com (
                                   1              ; serial number
                                   3600           ; refresh   [1h]
                                   600            ; retry     [10m]
                                   86400          ; expire    [1d]
                                   86400 )        ; min TTL   [1d]

www  A    127.0.0.1
     MX   10 mail
     MX   20 mail2
     TXT  "Parked Settings:Data={Font:Segoe; Color:Blue;
Keywords:Books,Action}"
```

LIGHTWEIGHT WEB PAGE GENERATION

CROSS-REFERENCE TO RELATED APPLICATION

This application is a continuation of U.S. patent application Ser. No. 14/208,986 entitled "LIGHTWEIGHT WEB PAGE GENERATION" and filed on Mar. 13, 2014.

FIELD OF THE INVENTION

The present invention relates generally to a system for web page generation and, more particularly, to systems and methods for web page generation using settings data stored in a domain name system (DNS) record.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding web pages on the Internet is generally known as the World Wide Web (WWW) or simply web.

Websites may be created using HyperText Markup Language (HTML). The HTML tags define how the webpages for the website are to be displayed. Users of the Internet may access content providers' websites using software known as a Web browser. After the browser has located the desired webpage, the browser requests and receives information from the webserver typically in the form of an HTML document, and then displays the webpage content for the user. The user may then view other web pages at the same website or move to an entirely different website using the browser.

In most cases, browsers are able to locate specific websites because the website is hosted by a server computer having a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other, e.g. 64.202.167.32. The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon, for example 2EDC:BA98:0332:0000:CF8A:000C:2154:7313.

But IP addresses, even in a human readable notation, are difficult to remember and use by people. Uniform Resource Locators (URL) are strings of test that are easier to remember than IP addresses and may be used to point to any website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and the "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g., .com, .net, org, .biz, .us, .cc, .ws, .de, etc.). TLD extensions can be divided into two groups. The first group is known as generic Top-Level Domains (gTLD) and the second group is country code TLDs (ccTLD).

Domain names are much easier to remember and use than their corresponding IP addresses. The Internet Corporation for Assigned Names and Numbers (ICANN) approves some gTLDs and delegates the responsibility to a particular organization (hereinafter registry) for maintaining an authoritative source for the registered domain names within a TLD and their corresponding IP addresses. For certain TLDs, e.g., .biz, .info, .name, and .org, the registry is also the authoritative source for contact information related to the domain name and is referred to as a "thick" registry. For other TLDs, e.g., .com, .net, only the domain name and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, org and some other registries allows a customer to use an ICANN-accredited registrar. For example, if a customer, John Doe, wishes to register the domain name "JohnDoe.com", John Doe may initially determine whether the desired domain name is available by contacting a registrar. The customer may make this contact using the registrar's webpage and typing the desired domain name into a field on the registrar's webpage created for this purpose. Upon receiving the request from the customer, the registrar may ascertain whether "JohnDoe.com" has already been registered by checking the SRS database of the registry associated with the TLD of the domain name. The results of the search may then be displayed on the webpage to thereby notify the customer of the availability of the domain name. If the domain name is available, the customer may proceed with the registration process. Otherwise, the customer may keep selecting alternative domain names until an available domain name is found.

Domain names are typically registered for a period of one to ten years. If the registrant does not renew the domain name, the domain name will expire. Shortly after the domain name goes past its expiration date the domain name will be deactivated. In most cases, all domain services including the web page and email will no longer work or be accessible. Then, for some time period (e.g., 40 days) the domain name will be in a "grace period". During this time the domain name will not be active and may be renewed without paying any additional fees. At the end of the grace period the domain name will enter a redemption period. WHOIS information (name, address, telephone numbers, etc.) will be deleted from the registry. The domain may be renewed by its original owner for a fee during the redemption period. Some time after the end of the redemption period the domain name will be deleted from the registry and will be made available for anyone to register.

Figure 1:
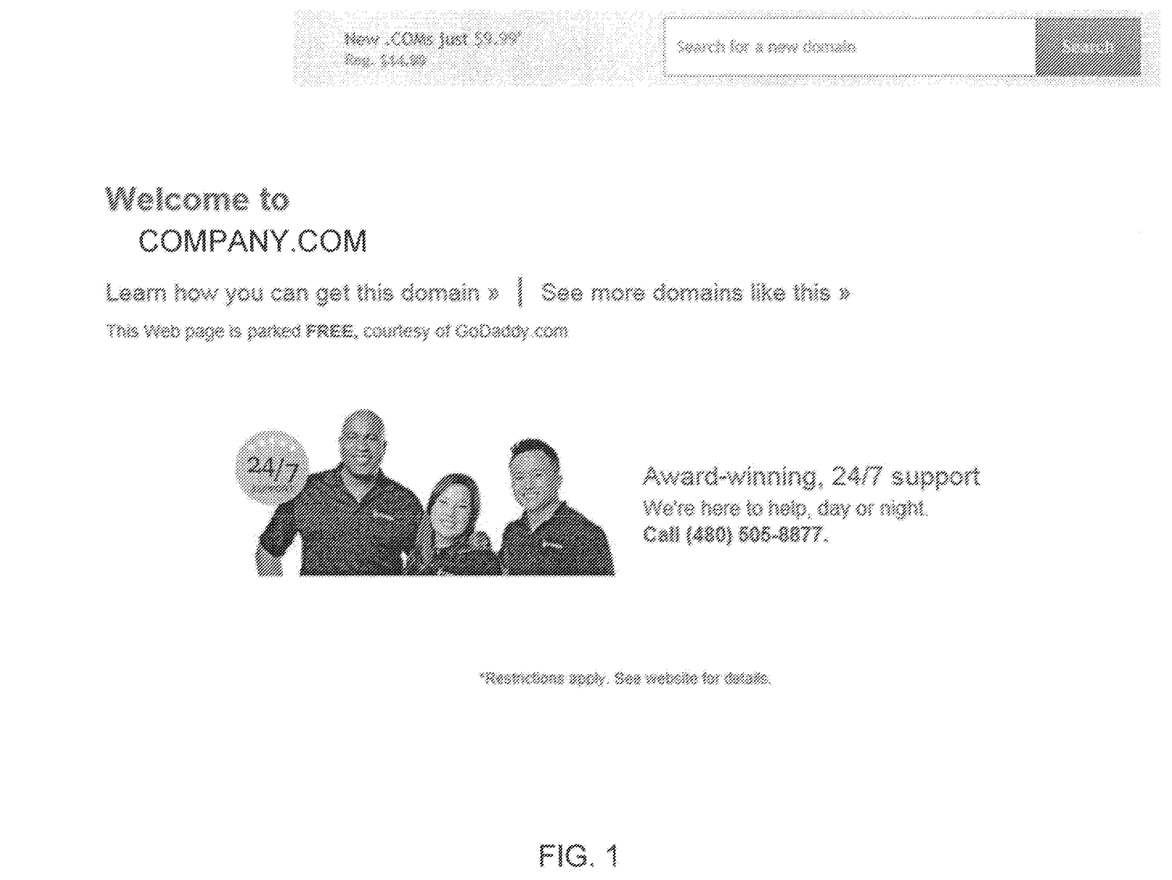
FIG. 1 is a screenshot showing a webpage snapshot from a parked web page.

After the customer registers a domain name she may create a website. In the meantime a temporary page may be associated with the domain name. A temporary page may state "under construction," "coming soon," "this domain was registered," "for sale," etc. Often the registrar will provide this temporary page for the customer. The registrar may place an advertisement on the temporary page. Often the temporary web pages without substantive content are referred to as parked web pages, meaning the domain name is parked and awaiting further action (e.g. creating a website). FIG. 1 demonstrates a webpage snapshot from a parked web page.

Parked web pages are usually designed by the registrar to be suitable default web pages that can be associated with a customer's domain name until the customer is able to replace the parked web page with their own web page. This may involve the parked pages being displayed for a relatively long amount of time, sometimes over several years. For the most part, the parked pages have a standard design and layout, allowing one web page to be a suitable parked web page for a large number of domain names. But even though the parked web pages are usually relatively simple, including only a minimal amount of information, the back-end servers, databases, and other systems required to process the parked pages can be expensive to maintain and operate.

DETAILED DESCRIPTION

The present invention relates generally to a system for web page generation and, more particularly, to systems and methods for web page generation using settings data stored in a domain name system (DNS) record.

In one implementation, a method includes receiving, by at least one server communicatively coupled to a network, a request identifying a domain name and a web page, and retrieving, by the at least one server and from a domain name system, a TXT record associated with the domain name. The method includes analyzing, by the at least one server, the TXT record to identify one or more settings associated with the domain name or the web page, rendering, by the at least one server, the web page in accordance with the one or more settings into a rendered web page, and transmitting, by the at least one server, the rendered web page to a computer system using the network In another implementation, a method includes receiving, by at least one server communicatively coupled to a network, a request identifying a domain name and a web page, generating, by the at least one server, a rendered web page using settings retrieved from a domain name system (DNS) record associated with the domain name, and transmitting, by the at least one server, the rendered web page to a computer system using the network.

In another implementation, a system includes at least one server computer in communication with a network. The at least one server computer includes a processor configured to receive a request identifying a domain name and a web page, generate a rendered web page using settings retrieved from a domain name system (DNS) record associated with the domain name, and transmit the rendered web page to a computer system using the network.

This description primarily discusses illustrative embodiments as being implemented in conjunction with the rendering and display of parked web pages. It should be noted, however, that discussion of parked web pages is but one example of many different types of web pages that may be displayed in accordance with the illustrative embodiments, such as lightweight web sites, coming soon web pages, and the like. The present system and method may be utilized in the rendering and display of any web content, whether including parked web pages or other web pages, and the like. Accordingly, discussion of parked web pages is not intended to limit the various embodiments of the invention discussed herein.

Figure 2:
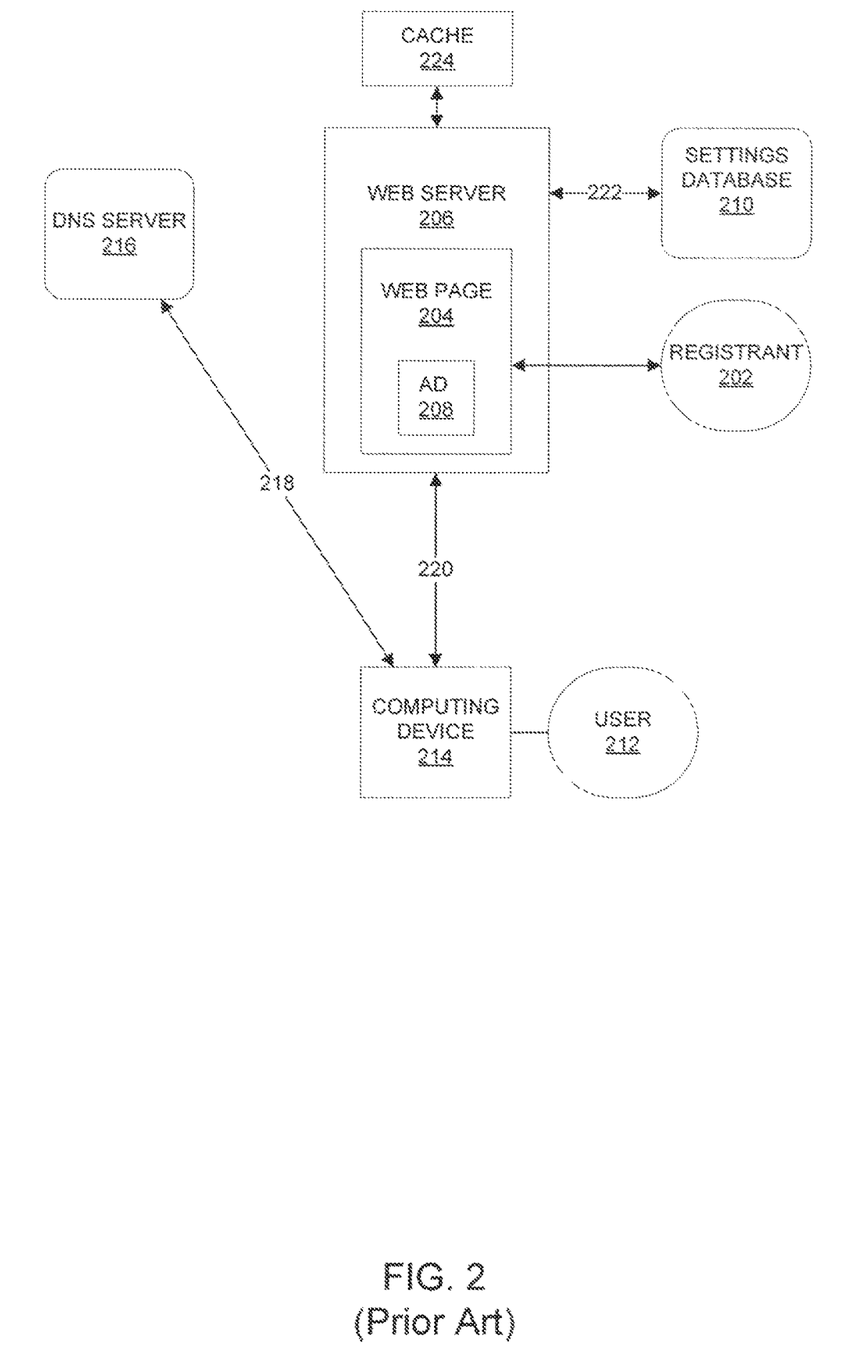
FIG. 2 is a block diagram depicting a conventional web hosting arrangement.

Referring to FIG. 2, in a conventional arrangement a registrant 202 may register a domain name with a domain name registrar. If registrant 202 does not have substantive content for a website associated with the domain name, a web page 204 (e.g., a parked web page) may be placed on the website associated with the domain name. The web page 204 may be supplied by the domain name registrar and hosted by a server computer 206 operated by the registrar. The web page 204 may be a "for sale" webpage, a "coming soon" webpage, an "under construction" webpage, etc.

A number of settings may be used to control how web page 204 is displayed. The settings may specify a particular template that is to be used to render web page 204, colors or style sheets to be used in displaying web page 204, and particular multimedia (e.g., images, video, audio, and the like) to be displayed within web page 204 or otherwise incorporated into web page 204. The various settings to be used in rendering web page 204 may be selected by registrant 202, the registrar, another entity, or combinations thereof.

In some cases, an advertisement 208 is also placed on the web page 204. Advertisement 208 may, for example, display one or more other domain names that may be available for registration, products or services that may be useful to one or more of the registrant 202 or a user 212 visiting the web page 204, and the like. The suggested domain names may be generated by a domain name module based on the properties of the original domain name.

The settings associated with web page 204 are stored in settings database 210. In many system implementations, settings database 210 includes an object-relational database (e.g., PostgreSQL, ORACLE database, MICROSOFT SQL SERVER) configured to store the settings. The settings may be stored, for example, in one or more tables of a relational database.

User 212 may view parked web page 204 via a web browser running on the user's computing device 214. To do so, user 212 types the domain name into an address bar of the browser. After entering the domain name, the user's computing device 214 accesses DNS system 216 in order to resolve the domain name into an IP address (as indicated by arrow 218). Once the IP address associated with the domain name is identified, the user's computing device 214 communicates with web server 206 in order to retrieve the content of the desired web page 204.

Because web server 206 may store the content for many different websites, the request transmitted by the user's computing device 214 (indicated by arrow 220) identifies the website (and, specifically, the web page) that user 212 wishes to retrieve from web server 206. The identification may be explicit (e.g., by identifying the website and/or web page in a header) or implicitly (e.g., by the IP address identified in the request). In one implementation, the website is identified, for example, in a header field of the request transmitted by the user's computing device 214.

Upon receiving the request from the user's computing device 214, web server 206 accesses settings database 210 to retrieve all of the display settings for the requested web page 204 (see arrow 222). As discussed above, the settings may set forth various attributes of the web page, such as a particular layout or template for the web page 204 as well as particular graphics or sets of graphics (e.g., images, video, or other multimedia) for the web page, and, potentially, the advertisements or types of advertisements to be displayed.

After web server 206 has retrieved the settings from settings database 210, web server 206 generates the web page in a format rendered in accordance with the settings retrieved from settings database 210. Web server 206 then transmits the rendered web page data to the user's computing device 214. The user's computing device 214 receives the rendered web page 204 and can then display the web page 204 for user 212.

In some cases, particularly where web page 204 is a parked web page and one or more advertisements 208 are displayed on the parked web page, some form of payment may be made to the holder of the domain name in exchange for the display of advertisements 208. In that case, the identification of the domain name owner may also be retrieved from settings database 210 enabling payment to be made to the owner. The identification may include, for example, a customer identification code that is stored in settings database 210 in association with parked web page 204.

Referring to FIG. 2, therefore, it is apparent that in a conventional arrangement, a separate settings database 210 must be maintained to store the settings associated with one or more of the web pages 204 on web server 206. The maintenance of settings database 210 both adds complexity and, in many cases, can reduce the performance of the overall system because web server 206 must retrieve the settings information from settings database 210 every time web page 204 is to be displayed and any delay in the communication link between web server 206 and settings database 210 can also delay the transmission of the content of web page 204 to the user's computing device 214. Additionally, when a particular domain name is to be transferred from one party to another, this implementation can add complexity to the process of executing that transfer.

In some cases, in an effort to improve system performance cache 224 may be implemented within or connected to web server 206 to temporarily store settings retrieved from settings database 210. The cache will generally be implemented as a data store (e.g., a database) that is separate from settings database 210 and configured to temporarily store data retrieved from settings database 210. The cache, either due to its proximity to web server 206 or implementation via high-performance memory systems, will usually be quicker to access than settings database 210. By retrieving settings from the cache rather than settings database 210, web server 206 can more quickly retrieve settings data for a particular web page, assuming that the settings are stored in cache 224, thereby improving the overall performance of the system.

Figure 3:
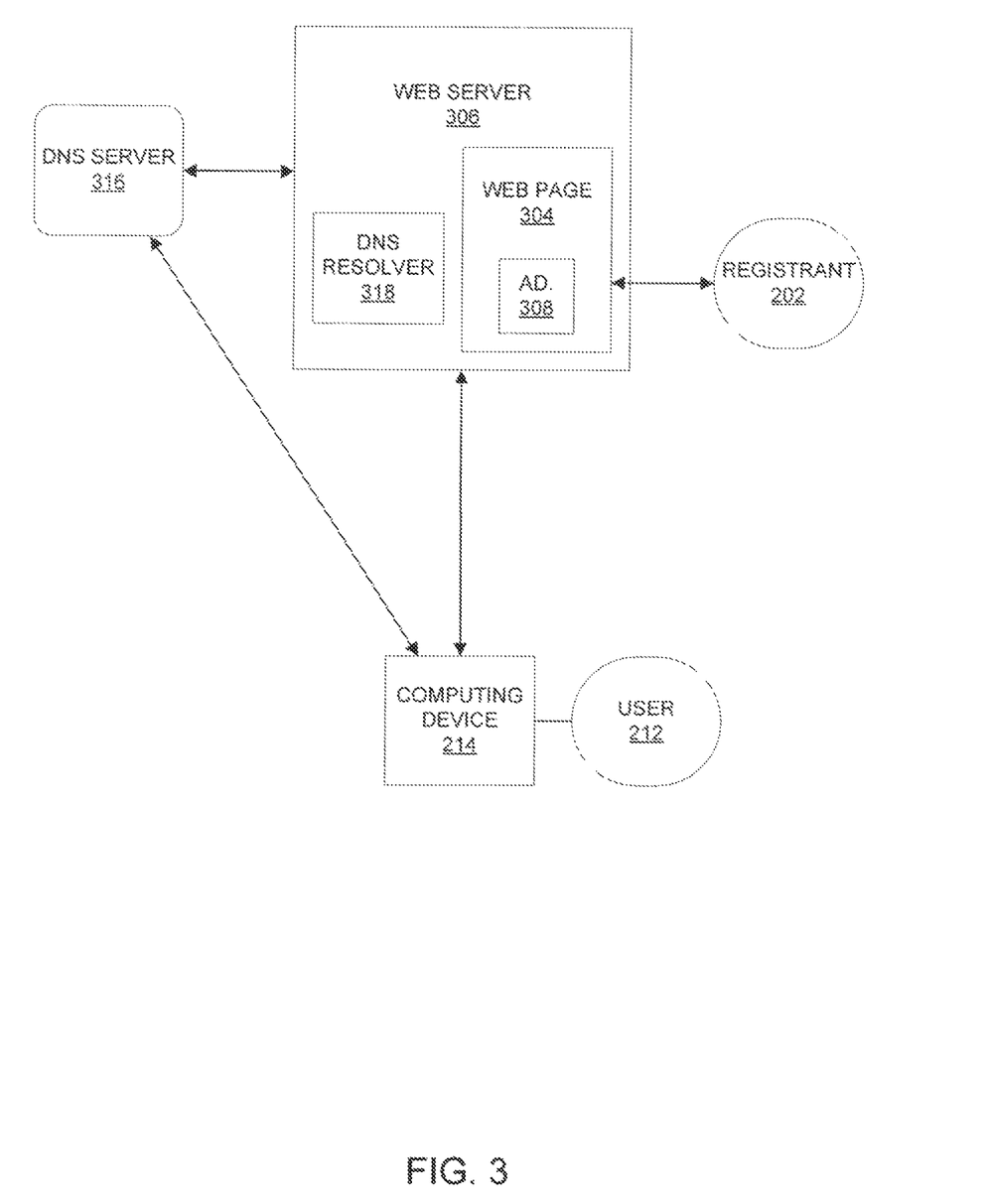
FIG. 3 is a block diagram showing an example system for generating web page content configured in accordance with the present disclosure.

FIG. 3 is a block diagram showing functional elements of a system for generating web page content configured in accordance with the present disclosure. Web server 306 is configured to render web page 304 (e.g., a parked web page) and, potentially, advertisement 308, in accordance with a number of settings and then transmit the rendered web page to a computing device 214 of user 212. However, in the system of FIG. 3, the settings for web page 304, rather than being stored in a separate settings database, are stored within DNS server 316. Specifically, the settings are stored in association with the DNS record associated with web page 304.

As is known, the DNS is a robust distributed naming system that stores naming information for a number of resources connected to the Internet or another computer network. Generally, the DNS system stores information mapping a name of a resource (e.g., www.company.com) to a particular IP address. The DNS system can also store information setting forth a number of email servers that are servicing a particular domain name.

The DNS stores records using a number of different types of records. The following are some example records that may be used in a particular entry in a DNS for a domain name. A records assign an IP address to a domain or subdomain name. AAAA records map a hostname to an IPv6 address. CNAME records map one domain or subdomain name to another A records (e.g., domain name). MX records map a domain name to a list of mail servers that service the domain. PTR records map a particular IP address to a host name. PTR records are useful for reverse DNS lookups in which an IP address is used in a query to identify a corresponding domain name. NS records identify the name servers for a particular domain name. TXT records store text and enable an administrator for a domain name to store arbitrary text in association with the DNS entry for that domain name.

The DNS is generally a very robust and distributed network. Given the importance of domain name resolution, the information for a particular domain name may be stored in the DNS on a number of different servers, each serving as backups to one another. To ensure that the records are up-to-date, the DNS enables a user to easily submit changes to the DNS records for a particular domain name. Those changes will then be propagated to other DNS servers storing information for the domain name ensuring that accurate and up-to-date domain name information is available using the DNS.

In many cases, to improve performance of the DNS, entities interacting with the DNS will temporarily store or cache retrieved DNS records. In the case of a client computer, for example, applications running on the computer (e.g., a web browser or email program on a user's laptop) utilize a locally-running DNS resolver to retrieve DNS information. The DNS resolver is a software application that is executed on the client computer. The DNS resolver is configured to receive DNS requests from the applications running on the client's computer system and then communicate with the DNS to respond to those requests. To improve performance, the DNS resolver will often be configured to cache records retrieved from the DNS for a period of time. The caching activities of the DNS resolver are generally invisible to the applications running on the user's computer, which only issue requests to the DNS resolver and receive responses. As such, the applications are not aware of whether the results of a particular request were retrieved from a cache, or a remote DNS server.

In the present system, settings associated with web page 304 are stored in a TXT record for the domain name associate with web page 304. For example, if web page 304 is "www.company.com", the settings for that web page are stored in DNS server 316 in a TXT record associated with the domain name www.company.com.

The settings may be stored in the TXT entry record in any suitable format for specifying a number of settings for web page 304, or the entire domain associated with web page 304. The settings may utilize any suitable markup, such as eXtensible Markup Language (XML), hypertext markup language (HTML), or any other language or text arrangement suitable for representing the web page's settings.

Figure 4:
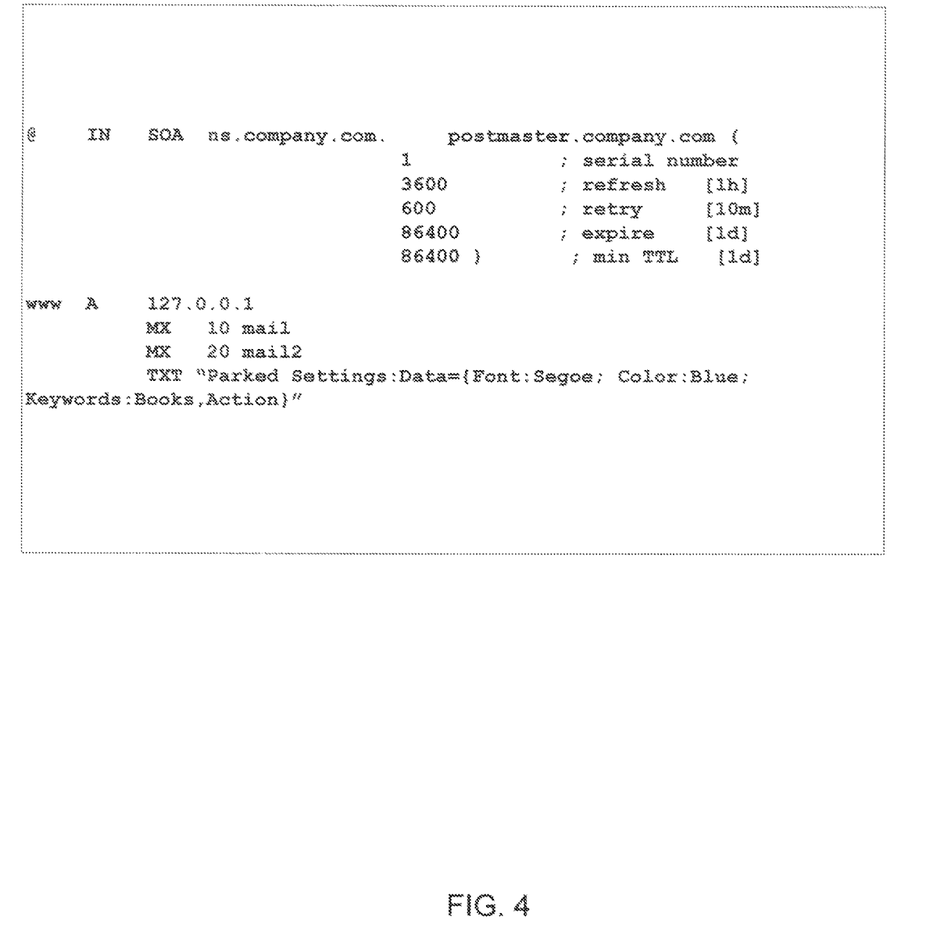
FIG. 4 depicts an example DNS record for the domain name company.com in which a number of settings are stored in a TXT entry in the DNS record.

FIG. 4 depicts an example DNS record for the domain name company.com in which a number of settings are stored in a TXT entry in the DNS record. As illustrated, the record has a predefined time-to-live (TTL) of 1 day or 86400 minutes, specified in a Start of Authority (SOA) entry in the record. The record also sets forth an IP address for the domain's web server (www) in an A entry, as well as some entries setting forth the mail servers for the domain in MX entries. Finally, the record includes a text (TXT) entry setting forth some settings for the web page hosted at www.company.com. As illustrated, the settings set forth a particular font that should be used in rendering the web page ("Segoe"), a particular color (e.g., background color) or color scheme for the web page ("Blue"), and specific keywords that are to be incorporated into the web page during rendering. This may be done by incorporating the keywords into a meta tag, or otherwise including the keywords in the source code of the web page, or displaying the keywords on the web page.

The settings values stored in the TXT record may set forth a name for the web page 304, a description of the web page 304, and a number of keywords for the web page 304, or combinations thereof. Visual attributes, such as colors, selected themes or display motifs, styles, and/or fonts may also be specified in the settings for the web page 304. One or more images (or references to images) may also be stored in the settings or referenced by the settings, where the images may ultimately be displayed on the web page 304. In accordance with the present disclosure, any settings that set forth one or more display attributes of the web page 304, as well as content used in the rendering or display of web page 304 may be stored in the settings for web page 304.

In some cases, the settings for web page 304 will also contain information identifying a user, user account, or partner that is to receive a payment based upon the number of time web page 304 is displayed or any other metric. When web page 304 is loaded, that information can be retrieved from the same or a new TXT record and used to initiate a payment to the identified entity. The identification can be stored in any suitable manner and may include a user account ID or number, an email address, a name and mailing address, bank account information, or any other suitable information useful for initiating a payment to a particular entity.

When rendering web page 304, web server 306 can use DNS resolver 318 to retrieve the DNS record for web page 304 from DNS server 316.

Figure 5:
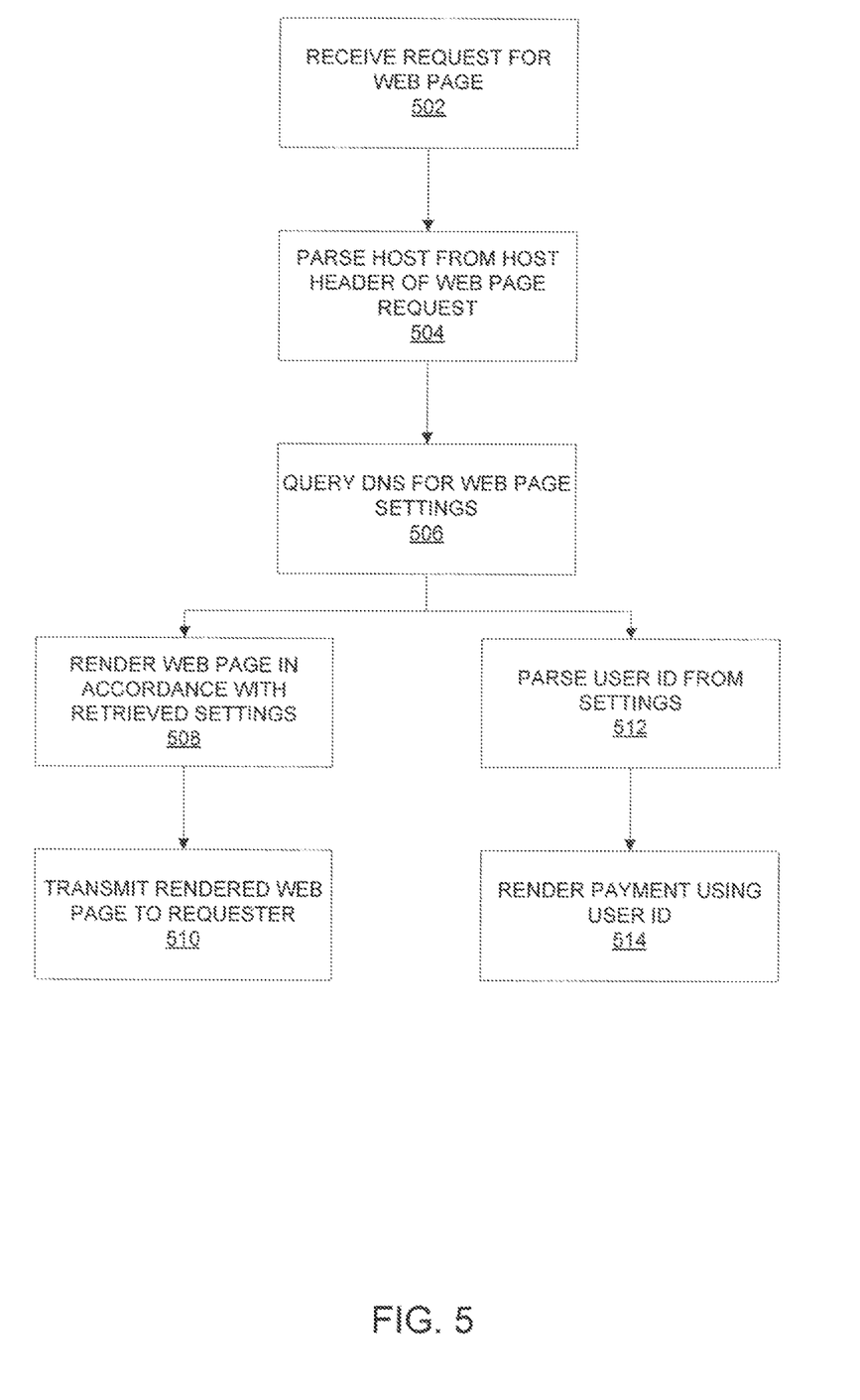
FIG. 5 is a flowchart illustrating a number of steps that may be performed by a web server to render a web page in response to a request from a user's computing device using settings stored in a DNS server.

FIG. 5 is a flowchart illustrating a number of steps that may be performed by web server 306 of FIG. 4 to render web page 304 in response to a request from a user's computing device 214 using settings stored in DNS server 316.

In step 502 web server 306 receives a request for web page 304 from the user's computing device 214. In one example, the request includes a hyper text transfer protocol request. The request will generally identify the web page being requested (which may be a root web page at a particular domain name), as well as the host name for the web page. The host name will specify a domain name, such as "company.com."

In step 504, web server 306 analyzes the received request to identify the host name. After the host name is identified, in step 506 DNS server 316 is queried to retrieve relevant DNS records associated with the host name, which may include the settings and owner for the website, although the owner may in some implementations bet set forth in the settings. In various implementations, the settings may all be encoded within a single TXT entry in the DNS records associated with the host name, though in other implementations the settings may be stored across two or more TXT entries (e.g., where each setting is stored in a single TXT record).

Step 506 may be performed by web server 306 issuing a request to DNS resolver 318 running on web server 306 or another computer system in communication with web server 306 which will, in turn, communicate with DNS server 316 to retrieve the DNS record for the requested web page 304. However, as described above, because DNS resolver 318 is configured to implement a cache for recently retrieved DNS records, if a cache version is available (and the cached version of the records is not out-of-date), the cached version of the DNS record will be returned to web server 306. The period of time for which a particular entry may be store in the cache of DNS resolver 318 before being refreshed may be controlled by a time to live (TTL) value that may be associated with a particular DNS entry. The TTL may, for example, specify a number of minutes, hours, or days for which a particular entry may be cached before it should be refreshed.

In another implementation, DNS resolver 318 may be implemented as a separate cache that can be used to temporarily store all or a portion of DNS records retrieved from DNS server 316. In that case, the cache may use the record's TTL values to determine a maximum lifetime for records that are stored within the cache. Once that time period for a particular entry has expired, the cache can re-retrieve the DNS record data from DNS server 316 ensuring that any changes made to the record stored in DNS server 316 are incorporated into the cached data in a timely fashion. In such an implementation, the cache may reside within web server 306, or be implemented on a computer system external to or remote from web server 306, in which case web server 306 may issue requests for DNS records to the cache over a communications network.

In step 508, once the DNS records have been retrieved for the host name for web page 304, the records are parsed to identify a number of settings that can be used in rendering the web page 304 for display in step 510. Parsing may involve identifying a plurality of key pairs in the DNS records, where the key pairs set forth a number of different settings for the web page to be used in rendering the web page.

In some implementations, perhaps where web page 304 is a parked web page containing advertising, optional step 512 is performed in which the DNS record is parsed to identify a user ID, or other identification of an entity to which payment should be made based upon the transmittal of the advertising content within web page 304. Once the user ID is identified, therefore, in step 514 a compensatory payment can be made to the entity identified by the user ID. This step may involve using the user ID to query one or more customer or subscriber databases in order to identify sufficient information to initiate the payment.

The present disclosure, therefore, provides methods and systems for a stateless or lightweight web page rendering system in which settings controlling how a web page is to be displayed and, optionally, identifying an entity to which payment in exchange for the rendering of advertising should be made can be stored in the DNS record associated with the web page. As discussed above, DNS provides a robust database into which the web page settings can be stored. Tools already exist enabling the querying of DNS records and, as discussed above, those tools (often referred to as DNS resolvers) often incorporate built-in caching systems enabling improved performance in accessing DNS records. As such, the retrieval of settings for a particular web page can be performed using known tools containing built in caches. This approach can greatly reduce the complexity of a web page rendering system, as described above.

One candidate implementation for the present system and method is in the provisioning of services for parking or lightweight web page hosting and generation. In a conventional arrangement, a user that wishes to host a temporary, parked web page with a particular host would be require to create an account with that host. Once the account is created, the user points his or her domain to the IP address of the host's server farm and then also specifies a number of settings for the parked web page. If the parked web page is to include advertising and payment is to be made to the user, the user would also have to provide a suitable user id enabling payments to be made to the user. Once this information has been provided though a suitable user account management interface provided by the host, the parked web page can then be served in response to requests from third party computer systems.

In contrast, using the present system, if a user wished to host a parked web page with a particular hosting entity, the user would not be required to go through the process of creating a user account with the hosting entity. Instead, the user could merely change the DNS record for the web page to be parked by pointing the domain name to the IP address of the hosting entity's server farm. The user could then add one or more settings to the DNS record to control how the web page is to be displayed. If the parked web page is to include advertising, and the user is to be compensated, the user could add information to the DNS record, such as a user ID, email address, or banking account information, enabling payment to be made back to the user. As such, the user would be able to park a web page and, optionally, provide information necessary for receipt of advertising payment, by modifying only the DNS record for the web page. There could be no requirement that the user create an account with the hosting provider or, at the least, would be required to only provide minimal information to the hosting provider.

In other implementations, however, the user may elect to create an account with the hosting entity for the purpose of receiving payment. In that case, the user may be required to provide only a minimal amount of information to the hosting entity, such as identifying information and additional information to allow for payments to be made to the user. If the user's domain name or domain names are already registered with the hosting entity, rather than require the user to submit additional account information, the payment account information may instead be drawn from pre-existing customer records associated with the user that are accessible to the hosting entity. Even if the user has registered multiple domains (and even if those domain names are registered with multiple different registrars), the present system can only require the creation of a single payment account with the hosting entity in order for the user to receive payments in exchange for parking one or more of those domain names with the hosting entity. Once the payment account is created, the user is provided with an identification code that can be used to identify the user's payment account. That identification code can then be inserted into a TXT record in the DNS entry for each of the user's domain names. When one of the user's domain names is visited, the hosting entity can then use the DNS settings to both render the parked web page and also to identify the user's payment account, enabling a payment to be made to the user.

In other implementations, a registrar may establish a payment account with the hosting entity. To do so, the registrar may create a payment account with the hosting entity containing information enabling the hosting entity to make payments to the registrar. The payment account created by the registrar may in some implementations be similar to the payment account created by a user, described above. The payment account may be created via a web page, or the registrar may contact the hosting entity via telephone to establish the payment account. The payment account may contain bank account routing information enabling payment, information associated with an alternative form of payment (e.g., an email address suitable for receipt of PAYPAL payment), or, alternatively, a mailing address to which a payment check may be issued or other money transfer may be made.

Once the payment account is established for the registrar, a number of the registrar's customers may then elect to park their domain names with the hosting entity. To do this, the registrar's customers would create DNS entries for the domain names they wish to park, where each DNS entry associates the domain name with the IP address of the host's server farm (e.g., the IP address of server 306 in FIG. 3), and includes one or more TXT records containing settings setting forth how the parked web page is to be displayed (e.g., type of advertising, themes, colors, etc.) and, optionally, a number of keywords that may be incorporated into the parked web page. This may be done manually, where the users edit their own DNS records directly (e.g., by hand or using an automated tool), or the registrar may create the DNS records on behalf of the users, either in response to an instruction to do so from the users, or without instructions from the users. The DNS entries for each of the parked domain names may include an identifier to associate the DNS entries with the registrar's payment account. In some cases, when the DNS entries are created by the registrar or the registrar's customers, the DNS entry may also include an identification code that can be used by the registrar to identify its own customers.

When the DNS entries have been created, the hosting entity will begin serving up parked web page content for each domain name via the hosting entity's server farm. The hosting entity can then monitor traffic to each of the parked domain names. When monitoring traffic, the hosting entity will maintain a database identifying how much traffic has visited each of the parked domain names, as well as the payment account associated with each domain name. Where the payment account is associated with a registrar, the database may identify traffic for many different domain names (e.g., thousands of domain names).

Periodically, the hosting entity will, based upon the volume of traffic to the domain names and associated advertising views, make a payment to the payment account holders.

Along with the payment, the hosting entity can include a report containing metrics identifying the amount of traffic that visited each domain name associated with the payment account. When the payment account is held by a registrar, the metrics may include additional data retrieved from the DNS entries for each domain name. For example, if the DNS entries include an identification code identifying the registrar's own customers, the metrics may include that identification code. The registrar can then use those metrics to divide the payment received from the hosting entity amongst the registrar's customers. The customers having domain names that saw the most traffic may receive a larger share of the payment than those customers having less traffic. Additionally, the registrar could also keep a percentage of the payment as its own revenue. A similar set of metrics may be sent to each payment account holder enabling each payment account holder to understand how traffic is flowing to each domain name parked with the hosting entity.

When editing the DNS record for a particular web page (i.e., to add the settings information to the DNS record), the user may do so manually, by typing out the settings and manually adding the typed-out settings into the DNS record. In other cases, however, one or more software tools may be provided to enable to a user to control a suitable settings entry to be added to the DNS record. Once the settings entry is generated by the software tool, the user can then manually add the settings to the DNS record (e.g., by cutting and pasting), or the software tool may provide the user with an option to automatically update the DNS record for the web page to include the settings information.

In some cases a number of conventional web pages for which settings are stored in a conventional database may be converted into web pages for which settings are stored in DNS entries for the web page's domain names. Such a process may involve, for each domain name of the web pages being converted, accessing the corresponding settings stored in the database for each domain name's web page. Once the settings are retrieved, text files can be generated, where the text files contain the lightweight page rendering settings in some suitably arranged text format (e.g., XML, HTML, or some other encoding format). The text settings can then be placed into a suitable DNS entry (e.g., a TXT record associated with the domain name).

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The invention claimed is:

1. A method, comprising:
retrieving, by at least one server and from a domain name system, a TXT record associated with a domain name;
generating, by the at least one server, web page code by rendering at least one visual attribute of the web page code in accordance with a setting in the TXT record; and
transmitting, by the at least one server, the web page code to a computer system using a network.

2. The method of claim 1, wherein the setting includes a style or a template to be used in generating the web page code.

3. The method of claim 1, including, after retrieving the TXT record associated with the domain name, storing the TXT record in a cache of the at least one server.

4. The method of claim 1, wherein retrieving the TXT record associated with the domain name is performed by a domain name system resolver running on the at least one server.

5. The method of claim 1, wherein the TXT record includes an identification of a third party and including using the identification of the third party to transmit a payment to the third party.

6. The method of claim 5, including:
transmitting to the third party a report identifying a plurality of domain names and associated traffic to web pages associated with the plurality of domain names, the plurality of domain names including the domain name.

7. The method of claim 6, wherein the third party is a registrar.

8. The method of claim 1, including:
identifying advertisement content using the setting in the TXT record; and
incorporating the advertisement content into the web page code.

9. A method, comprising:
receiving, by at least one server communicatively coupled to a network, a TXT record associated with a domain name;
decoding, by the at least one server, the TXT record to identify a setting for the domain name;
generating, by the at least one server, web page code by rendering at least one visual attribute of the web page code in accordance with a setting in the TXT record; and
transmitting, by the at least one server, the web page code to a computer system using the network.

10. The method of claim 9, wherein the setting identifies a style or a template to be used in generating the web page code.

11. The method of claim 9, wherein the TXT record includes an identification of a third party and including using the identification of the third part to transmit a payment to the third party.

12. The method of claim 11, including:
transmitting to the third party a report identifying a plurality of domain names and associated traffic to web pages associated with the plurality of domain names, the plurality of domain names including the domain name.

13. The method of claim 12, wherein the third party is a registrar.

14. The method of claim 9, including:
identifying advertisement content using the TXT record; and
incorporating the advertisement content into the web page code.

15. A system, comprising:
a domain name system server including at least one processor configured to:
store, in a storage device coupled to the domain name system server, a domain name system record including a TXT record, the TXT record encoding a visual attribute setting for a web page code associated with the domain name system record; and
transmit, in response to a request from a server computer, the domain name system record to the server computer, the server computer being configured to generate web page code by rendering at least one visual attribute of the web page code in accordance with the visual attribute setting in the TXT record.

16. The system of claim 15, wherein the visual attribute setting identifies a style or a template to be used in generating the web page code.

17. The system of claim 15, wherein the domain name system record includes an identification of a third party.

18. The system of claim 17, wherein the server computer is configured to use the identification of the third party to transmit a payment to the third party.

19. The system of claim 15, wherein the visual attribute setting identifies an advertisement content.

20. The system of claim 19, wherein the server computer is configured to incorporate the advertisement content into the web page code.

* * * * *